United States Patent [19]

Morimoto et al.

[11] 3,900,174

[45] Aug. 19, 1975

[54] AUTOMATIC MAGNETIC TAPE RECORDING AND REPRODUCING DEVICE

[75] Inventors: Toshio Morimoto, Hirakata; Yoshiaki Fukunaga, Moriguchi, both of Japan

[73] Assignee: Matsushita Electric Industrial Co., Ltd., Kadoma, Japan

[22] Filed: Jan. 4, 1974

[21] Appl. No.: 430,665

Related U.S. Application Data

[63] Continuation of Ser. No. 286,002, Sept. 5, 1972, abandoned, which is a continuation of Ser. No. 108,142, Jan. 20, 1971, abandoned, which is a continuation of Ser. No. 700,527, Jan. 25, 1968, abandoned.

[30] Foreign Application Priority Data

May 4, 1967 Japan ................................ 42-29040
May 4, 1967 Japan ................................ 42-29041

[52] U.S. Cl. ................ 242/209; 226/188; 242/201; 242/204

[51] Int. Cl. ........................................... G11b 15/30

[58] Field of Search ........... 242/201, 202, 203, 204, 242/205, 206, 207, 208, 209, 210, 179; 226/181, 188

[56] References Cited

UNITED STATES PATENTS

| | | | |
|---|---|---|---|
| 3,009,663 | 11/1961 | Armstead | 242/201 |
| 3,409,239 | 11/1968 | Siebert | 242/190 |

*Primary Examiner*—George F. Mautz
*Attorney, Agent, or Firm*—Stevens, Davis, Miller & Mosher

[57] ABSTRACT

An automatic reciprocating magnetic tape recording and reproducing apparatus wherein a driving wheel is interposed between a tape supply reel stand and a tape take-up reel stand, two rockable idlers are provided between said driving wheel and said two reel stands, a frictional member is rotated by said driving wheel to pull said idlers from the opposite ends in such a direction as to elastically press said idlers between said two reel stands and said driving wheel, and either one of said idlers is selectively pressed into contact with the driving wheel and one of the reel stands through the movement of the frictional member which is caused by the forward or reverse rotation of said driving wheel, thereby selectively rotating one of the two reel stands.

4 Claims, 15 Drawing Figures

PATENTED AUG 1 9 1975 SHEET 1

3,900,174

PATENTED AUG 1 9 1975 SHEET 3 3,900,174

PATENTED AUG 1 9 1975

SHEET 6

3,900,174

AUTOMATIC MAGNETIC TAPE RECORDING AND REPRODUCING DEVICE

This is a continuation of Ser. No. 286,002, filed Sept. 5, 1972, now abaondoned, which in turn was a continuation of Ser. No. 108,142, filed Jan. 20, 1971, now abandoned, which in turn was a continuation of Ser. No. 700,527, filed Jan. 25, 1968, now abandoned.

BACKGROUND OF THE INVENTION:

This invention relates to a recording and reproducing apparatus using a magnetic tape, and more particularly it pertains to a recording and reproducing apparatus using a magnetic tape having multiple tracks such as, for example, two tracks, four tracks, etc. The present invention provides a reliable and simplified arrangement wherein repeated recording and reproduction can be automatically and uninterruptedly effected with respect to all the tracks of the tape from the start to the end thereof.

As it has many practical advantages, that is, the recording can be effected without requiring complicated operation and scrupulous attention, the record can be instantly reproduced, the recording can be made with high fidelity even by those unskilled in the art, the record can be erased and newly effected as often as desired, and the sound quality is not deteriorated with repeated reproduction, such recording and reproducing apparatus has been extensively used as a sound source in a broadcasting station, sound medium for records, recorder for television, memory means of an electronic computer or the like. It has also been widely used by the general public for the purpose of appreciating music, recording conferences, lectures and the like, studying foreign languages, etc.

As described above, the recording and reproducing apparatus of this type has many advantages and excellent characteristics. However, some trouble is encountered in handling the magnetic tape in use since it is too thin. In the case of a multi-track type magnetic recording and reproducing system using a single magnetic tape having multiple tracks, it is necessary that the spool having the magnetic tape wound thereon be turned over when the terminating end of the tape is reached. In an attempt to record or reproduce music, lectures, etc., therefore, it is necessary that the spool be turned over to continue the recording or playback when the end of the magnetic tape is reached. This means that the recording or reproducing operation is interrupted and the recording cannot be effected for the period of time required for turning over the spool.

In order to compensate for such inconvenience and to facilitate handling, cartridge type machines have been proposed. In such machines, however, it is still necessary that the spool be turned over, although the period of time needed for turning it over can be decreased.

There have also been proposed recording and reproducing apparatus of such type that a magnetic tape is automatically rewound onto a spool and supplied from the next spool, of such type that the running direction of a magnetic tape is manually reversed without turning the spool over and the recording or reproducing track is switched, of such type that said reversal of the tape running direction and track switching are automatically effected, etc.

However, most of these proposed machines have the following disadvantages: they are very expensive, their structure is complicated, the moment at which the reversal is to be effected must be visually monitored, the magnetic tape is loosened and an abnormal force is imparted thereto since the reversal of the tape running direction is not effected simultaneously with the switching of the tape take-up.

SUMMARY OF THE INVENTION

It is an object of this invention to provide an improved automatic reciprocating magnetic tape recording and reproducing apparatus of simplified construction wherein a magnetic tape is transported between two spools, the tape transportation is automatically reversed so that the tape is prevented from being loosened, the contact between the running tape and heads is always kept in a stable state, and non-uniformity in rotation is minimized, thus effectively improving the recording and reproducing performance.

Figure 1:
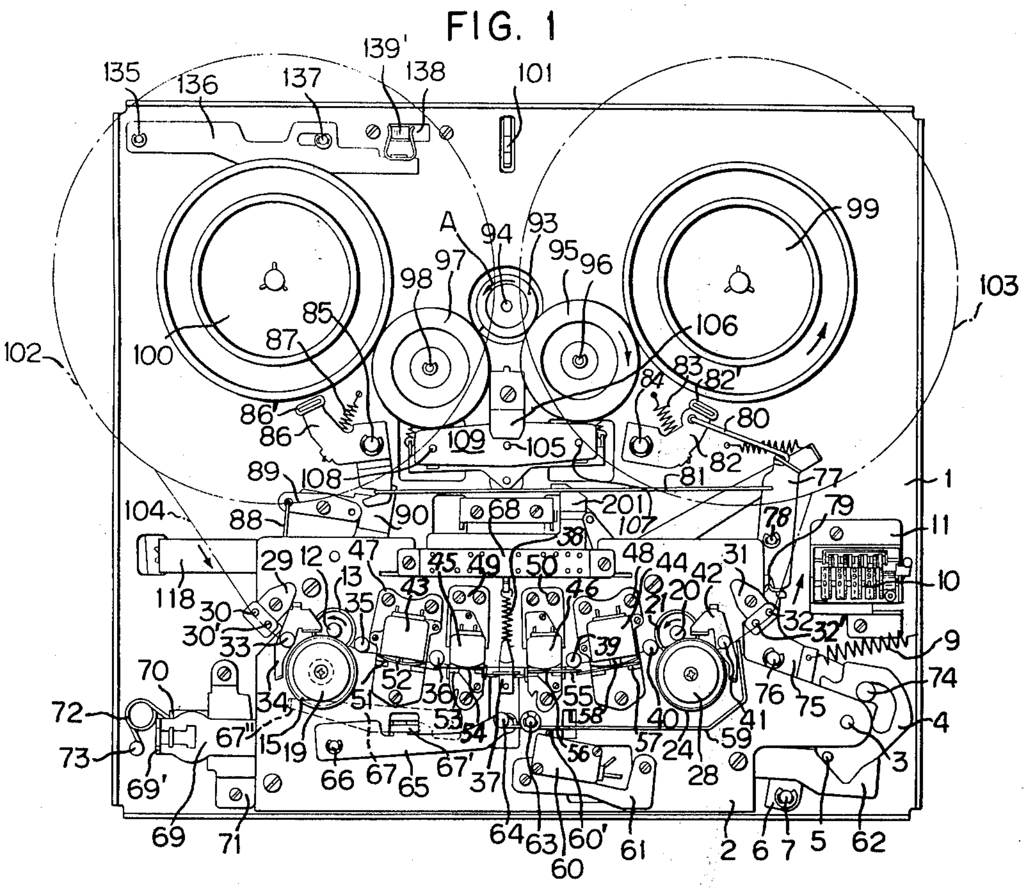
FIG. 1 is a top plan view of the magnetic tape recording and reproducing apparatus according to an embodiment of this invention, showing the forward recording or playback state thereof.
Figure 2:
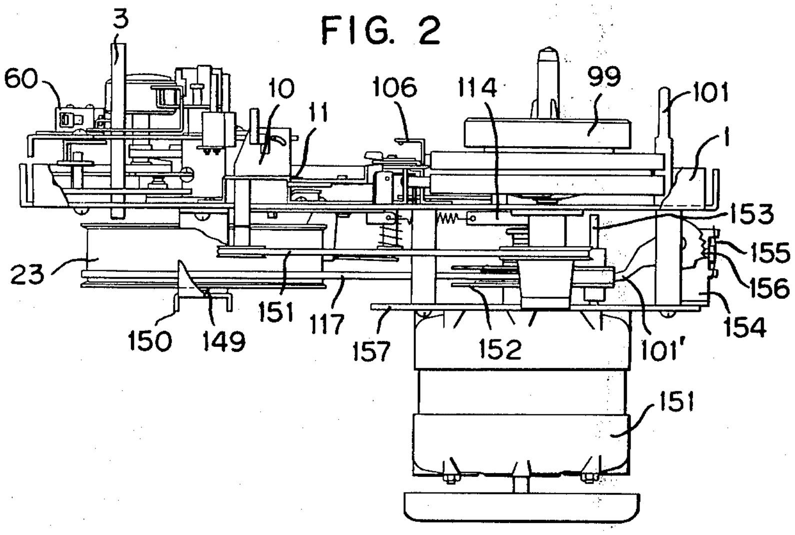
FIG. 2 is a right side view thereof.

DESCRIPTION OF THE PREFERRED EMBODIMENTS:

This invention will now be described in greater detail with reference to the accompanying drawings.

The reference numeral 1 represents a base plate on which all components are mounted. On the base plate, there are mounted a sub-base plate 2 having a head assembly attached thereto and a motor mounting plate 157 by means of struts.

A magnetic tape 104 is held between left and right capstan 12 and 20 and left and right pinch rollers 15 and 24 which are pressed against the capstans 12 and 20 respectively. The capstans 12 and 20 are affixed concentrically to left and right flywheels 14 and 23 which are rotated at a constant speed by means of a motor 151 through a belt 117 running around a motor pulley 93 fixed to said motor 151 and the flywheels. During the forward rotation as indicated by an arrow A, the magnetic tape 104 is wound from a tape spool 102 on a left reel stand 100 onto a tape spool 103 on a right reel stand 99 past left contact poles 30 and 30', tape guides 33, 35, 36, 39, 40 and 41, "reverse" erase head 45, "reverse" record-playback head 43, "forward" erase head 46, "forward" record-playback head 44 and right contact poles 32 and 32'.

The operation can be changed over by rotating an operation change-over means 3 by means of a lever. FIG. 1 shows the recording-playback condition, which can be switched to the stop condition by rotating the operation change-over means through 30° and to the fast-forward or fast-rewinding condition (referred to simply as fast-winding condition hereinafter) by further rotating said means. A cam plate 4 is secured to the operation change-over means 3. By rotating the cam plate 4, a brake lever 75, play lever 210 and shut-off lever 62 are rotated so that brake shoes 86' and 82' are brought into or out of pressed contact with the reel stands 99 and 100 respectively. Thus, the pinch rollers 15 and 24 are also brought into or out of pressed contact with the capstans 12 and 20 respectively, and idlers 95 and 97 are either brought into or out of pressed contact with the reel stands 99 and 100 or moved upwardly or downwardly so that the shut-off pin 59 is urged into or out of contact with the magnetic tape 104.

The motor 151 is provided on the motor mounting plate 157 which is mounted on the base plate 1 by means of the struts, and the motor pulley with different diameters capable of changing the speed of transportion of the magnetic tape 104 is affixed to the motor shaft 94. A belt shifter 152 for changing the position of the rubber belt is loosely fitted on a shaft 153 fixed to the motor mounting plate 157 in such a manner that it can be moved upwardly and downwardly. A tape speed change-over lever 101 has its fore end 101' disposed in engagement with the belt shifter 152 so that the latter is moved upwardly or downwardly through the actuation of the speed change-over lever 101, thus selectivel displacing the rubber belt 117 to a desired diameter portion of the motor pulley.

The speed change-over lever 101 is mounted on a mounting plate 154 on the motor mounting plate 157 and subjected to a clicking action by a steel ball 156 pressed against a spring plate 155.

Description will now be made of the brake mechanism. A brake lever 75 is provided on one end thereof with a shaft 92 on which is rotatably carried a roller 74 disposed in engagement with the cam plate 4, and it is rotatably mounted on a shaft 76 fixed to the base plate 1. On the other end of the brake lever 75, there are provided a nail portion 75''' adapted for engagement with an idler-off lever 148, and a projection 75' for restraining the rotation of a brake lever 77 which is rotatably carried on a shaft 78. Between the brake levers 75 and 77 is interposed a tension spring 79 which imparts a clockwise force to the brake lever 77 to urge the latter into contact with the projection 75'. A left brake rod 81 is fixed to the brake lever 77 and left brake lever 86 in such a manner as to extend therebetween, and a right brake rod 80 is fixed to the brake lever 77 and right brake lever 82 in such a manner as to extend therebetween. The right brake lever 82 is used to brake (or stop) the right reel stand 99. It is rotatably mounted on a shaft 84 fixed to the base plate, and energized counter-clockwise by means of a spring 83. A brake shoe 82' is provided on the fore end of the right brake lever 82. The left brake lever 86 is used to brake (or stop) the left reel stand 100. It is also rotatably mounted on a shaft 85 and energized clockwise by means of a spring 87. A brake shoe 86' is provided on the fore end of the left brake lever 86.

A temporary stop brake lever 90 rotatably mounted on a shaft 91 fixed to the base plate 1 is also disposed in engagement with the left brake rod 81. A temporary stopping rod 88 is connected with the temporary stopping brake lever 90 through an adjusting piece 89, and the other end of the rod 88 is connected with a temporary stopping lever 70. Thus, the left brake rod 81 is operated by manipulating the temporary stopping lever 70.

Description will now be made of the idler mechanism. Idlers 75 and 97 are rotatably mounted on shafts 96 and 98 fixed to arms 112 and 113 which are rotatably attached to shafts 107 and 108 of an idler lever 109, respectively.

A shaft 105 is fixed to the center of the idler lever 109 and fitted in a bush provided on the base plate 1. for upward and downward movement and rotation.

An idler driving lever 110 is rotatably attached to the shaft 105. A slip belt 114 is wound on the motor pulley 93 and connected with the opposite ends of the idler driving lever 110 through springs 115 and 116, so that the idler driving lever 110 is rotated clockwise or counter-clockwise in accordance with the direction of rotation of the motor pulley 93 by the frictional force of the slip belt 114.

The reference numeral 106 is a stopper for limiting the upward movement of the idler lever 109. A pin 111 is affixed to the idler driving lever 110, and it is brought into or out of a fork-end portion 148 of idler-off lever 146 in accordance with the movement of the idler-off lever 146. If the pin 111 is placed in the fork-end portion 148, the idler driving lever 110 is bisymmetrically positioned so that the idler lever 109 also becomes bisymmetrical and the idlers 95 and 97 are separated from the motor pulley 93.

On the sub-base plate 2 are provided contact poles 29 and 31, magnetic heads 43, 44, 45 and 46, type guides 33, 35, 36, 39, 40 and 41 and the like. The magnetic heads 43, 44, 45 and 46 are mounted on head mounting plates 47, 48, 49 and 50, and pads 52, 54, 56 and 58 adhered to pad plates 51, 53, 55 and 57 are pressed against the magnetic heads by means of a spring, thereby bringing the magnetic tape into close contact with the magnetic heads.

The contact poles 30, 30' and 32, 32' serve as contacts and are held by insulators 29 and 31. If such contacts are shorted with a metal foil applied on the magnetic tape, relay solenoids or the like are energized.

On the tape guides 33 and 41 are provided tape receivers 32 and 42 for preventing the tape from falling down, respectively.

Shut-off pin 59 is rotatably mounted on shaft 63 fixed to the sub-base plate 2. A balance weight 64 is provided on one end of the shut-off pin 59 which is energized counter-clockwise by a puch-button 60' of a shut-off switch 60 attached to the sub-base plate 2 through a mounting plate 61. Upon completion of the tape transportion, the shut-off pin 59 is further rotated counter-clockwise, thus opening the circuit of the shut-off switch 60.

In the "stop" state, the shut-off pin 59 is moved to the shut-off switch 60 by the fore end 62' of the shutoff lever 62 through the actuation of the cam plate 4, thus making it possible to easily insert a tape.

The pad plates are separated from each other or pressed against the heads by a pad shifter 37 with which is engaged a shifter lever 65 which is rotatably attached to a pin 66 on the sub-base plate 2. A lever 67 is placed in engagement with the shifter lever 65 and in contact with the shaft 18 of the pinch roller 15. Thus, the shifter lever 65 is moved through the displacement of the pinch roller 15, so that the pad shifter 37 is moved. A spring 38 is attached to the pad shifter 37. Thus, when the pinch roller 15 is pressed against the capstan 12, the pad shifter 37 is separated from the pad plates 53 and 55 by the spring 38, so that the pad is pressed against the heads.

The fore end 67'' of the lever 67 extends toward the base plate 1 and is associated with the temporary stopping lever 70 to separate the pad plates from the heads in the "temporary stop" state, as in the case where the pinch roller 15 is separated from the capstan 12.

The reference numeral 139 represents an electric switch for changing the direction of revolution of the motor. The reference numeral 68 denotes an electric switch for switching the heads from "forward" to "reverse" and vice versa. The electric circuits 139 and 68 are driven by a solenoid lever 120 which is rotated about a shaft 131 by a "reverse" solenoid 134, a pin 135 provided on the lever 120, a lever 136 guided by a pin 137 coupled to the pin 135, a leaf spring 138 fixed to the pin 135, and a lever 118 guided by a pin 119 disposed in engagement with the solenoid lever 120.

Description will be made of the mechanism related to the pinch rollers. Levers 203 and 202 are rotatably attached to pins 206 and 207 fixed to a control plate 201 which is guided by pins 204, 205 and 204' fixed to the base plate 1. The levers 203 and 202 are connected with each other through a spring 214. The control plate 201 is provided with a stopper for restraining the movement of the levers 202 and 203, and it is also provided with a projection 213. The pinch rollers 15 and 24 are fitted on the shafts 18 and 27 provided on the ends of pinch roller arms 16 and 25 which are rotatably attached to shafts 17 and 26 provided on the base plate, respectively. On the other ends of the pinch roller arms 16 and 25 are provided rollers 218 and 219 which are disposed in contact with the levers 202 and 203, respectively. The levers 202 and 203 are connected with each other through a spring 215.

The control plate 201 is rotatably mounted on a pin 211 provided on the base plate 1. On one end of the control plate 201 is fixedly provided a shaft 208 to which is attached a roller 209 which is brought into contact with the cam plate 4 by means of a spring 220. A pin 212 is fixed to the other end of the control plate 201. Thus, the control plate 201 is moved by a playback lever 210 engaged therewith.

The temporary stop lever 70 is mounted for rotation about the pin 205, and a click action spring 72 is interposed between one end of the lever 70 and pin 73. An operating lever 69 is associated with that portion which is constituted by the lever 70, pin 73 and spring 72.

Figures 11, 12, 13:
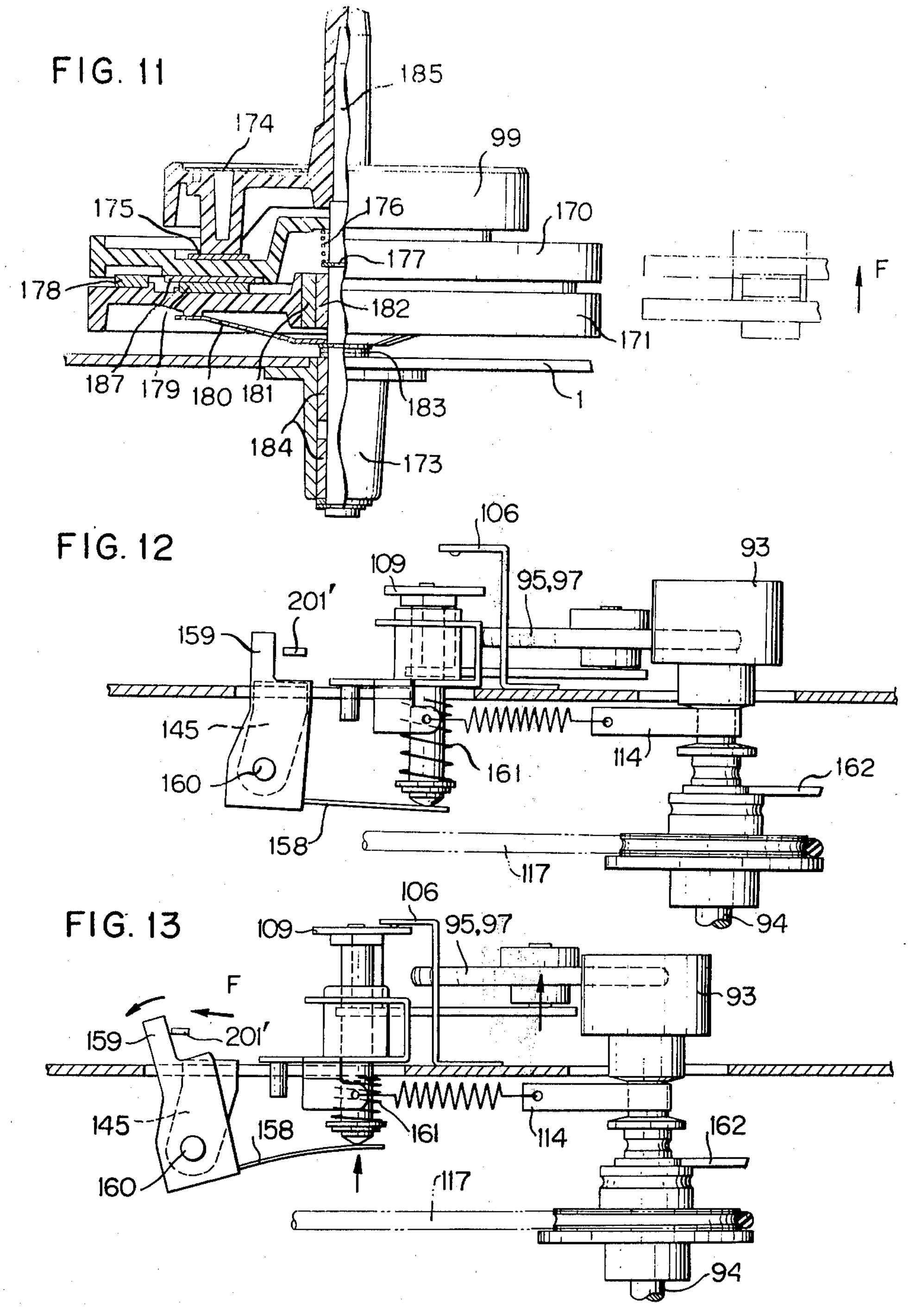
FIG. 11 is a view showing the construction of the reel stand portion.
FIG. 12 shows the relationship in height between the motor pulley and the idler when the apparatus is stopped or during the recording or reproducing operation.
FIG. 13 shows the relationship in height between the motor pulley and the idler during the fast-winding operation.

The left and right reel stands 99 and 100 are identical with each other in respect of structure. Therefore, only the right reel stand, which is shown in FIG. 11 will be explained herein. A decorative plate 174 is applied on the reel stand 99 on which a spool is to be placed, and a reel stand shaft 185 is fixed to the reel stand. A reel stand pulley 170 is pressed against the reel stand 99 through a slip member 175 with a low coefficient of friction such as felt or the like by a spring 176 compressed by a stop ring 177 of the reel stand shaft 185. By virtue of the frictional coupling between the reel stand 99 and the real stand pulley 170 through the spring 176, it is possible to protect the magnetic tape in case an abnormal force tends to be imparted to the tape at the start and end of the fast-winding operation. Furthermore, a slip plate 187 such as steel of an excellent wear resisting property is applied on the rear surface of the reel stand pulley 170. Another reel stand pulley 171 is similarly fitted on the reel stand shaft 185 below the reel stand pulley. The reel stand shaft 185 is rotated on a bearing 182 pressed into a bush 181. On the top surface of the reel stand pulley 171 is applied to stop member 179 with a low coefficient of friction such as felt or the like which frictionally slips on the slip plate 187 of the reel stand pulley 170. As oil spray preventing felt 178 is applied on the outer periphery of the reel stand pulley 171. The reel stand pulley 171 is pressed against the reel stand pulley 170 by the pressure imparted thereto by a leaf spring 180 interposed between the pulley 171 and the stop ring 183 of the reel stand shaft 185. The reference numeral 173 represents a bearing including bearing members 184. In case the idler as shown on the right-hand side of FIG. 11 is moved to the lower position into contact with the pulley 171, the recording or playback state is assumed by the apparatus, and a rotating force is imparted to the reel stand 99 through the frictional slip between the slip member 179 and the slip plate 187 to rotate the reel stand 99, whereby the tape is taken up. In case the idler is moved to the upper position into contact with the reel stand pulley 170, the fast-winding state is assumed by the apparatus, and a rotating force is imparted to the reel stand. The frictional slip caused by the slip plate 175 is determined to be greater than that caused by the slip member 179.

In the foregoing, the composition of the present invention has been described. The operation thereof will be explained hereinbelow.

Figure 14:
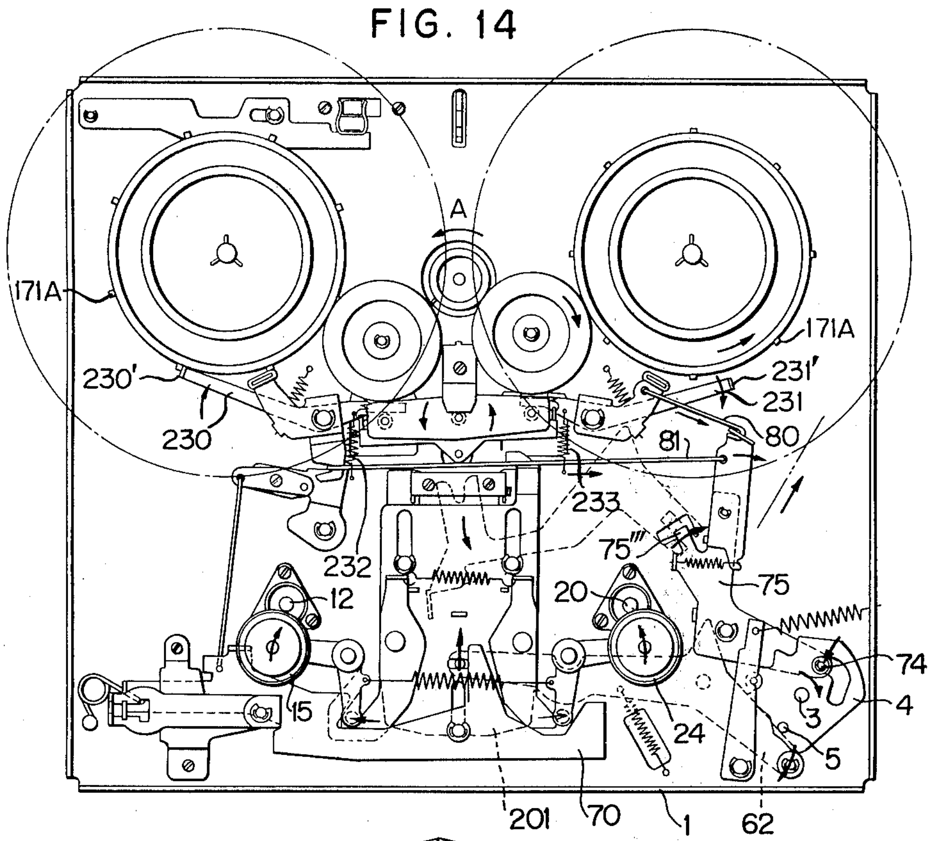
FIG. 14 is a top plan view of the main portion of the recording and reproducing apparatus according to another embodiment of this invention when the apparatus is operationally switched from the stop state to the recording or playback state.

Description will first be made of the reason why the tape is prevented from becoming loose while being transported by means of the two sets of capstans and pinch rollers, with reference to FIG. 14.

Assume that the motor is rotated in the direction indicated by an arrow A as shown in the drawing, that the diameter of the left flywheel 14 is $D_2$, that the diameter of the right flywheel 23 is $D_3$, that the diameters of the belts are $d_1$, $d_2$ and $d_3$, that the tensions applied to the belts are $T_1$, $T_2$ and $T_3$, and that the diameters of the capstans 12 and 20 are completely equal.

During the rotation in the direction indicated by the arrow A, the loads or tensions imparted to the belts are in such a relation that $T_1 < T_2 < T_3$. The higher the tension, the smaller becomes the diameter of each belt, since the latter is elastic. Therefore, $d_3 < d_2 < d_1$. In the case where the transmission is effected through such an elastic member, it is well known that the neutral point for the transmission of rotation is located substantially at the center of the elastic member or belt. Thus, following relationships hold (extremely small correction terms are omitted)

$$N_2 = N_1 \times \frac{D_1 + \frac{1}{2}(d_1 + d_3)}{D_2 + \frac{1}{2}(d_1 + d_2)}$$

$$N_3 = N_1 \times \frac{D_1 + \frac{1}{2}(d_1 + d_3)}{D_2 + \frac{1}{2}(d_2 + d_3)}$$

where $N_1$ is the rotational frequency of the motor pulley, $N_2$ is the rotational frequency of the left flywheel, and $N_3$ is the rotational frequency of the right flywheel. From the above relationships, the following equation is derived.

$$\frac{N_2}{N_3} = \frac{D_2 + \frac{1}{2}(d_3 + d_2)}{D_2 + \frac{1}{2}(d_1 + d_2)}$$

Since $d_3 < d_2 < d_1$, $(d_1 + d_2) > (d_2 + d_3)$: hence $(N_2/N_3) < 1$ or $N_2 < N_3$.

From this, it will be seen that the rotational frequency of the right flywheel is higher than that of the left flywheel, and that if the direction of rotation of the motor is reversed, the rotational frequency of the left flywheel becomes higher than that of the right flywheel. Since the flywheels are coaxial with respect to the capstans, the speed of the tape when it is driven by the capstan on the tape take-up side is always higher than when the tape is driven by the capstan on the tape supplying side irrespective of the running direction of the tape, so that the tape is prevented from being loosened because it is pulled between the two sets of pinch roller and capstan.

Furthermore, the tape is not loosened even when the running direction of the tape is changed, since the take-up speed is automatically made higher through rotation. By the fact that the two sets of capstan and pinch roller differ from each other in respect of tape driving speed, the tape is caused to be transported while being slipped between the capstans and the pinch rollers, so that the tape is maintained under tension. Thus, the tape is always pressed against the heads with a constant force, and it is transported at a constant speed by the capstans of high accuracy, so that the portion of the tape which is present between the two capstans is not affected by non-uniformity in the tape transportation, uneveness in the winding forces of the reel stands, uneveness in the back tension, twist of the tape, etc. This results in an enhanced accuracy of the tape transporting speed and uniform contact of the tape with the heads. Consequently, wow and flutter can be minimized so that substantially no level variation and sound drop out are caused.

Figure 3:
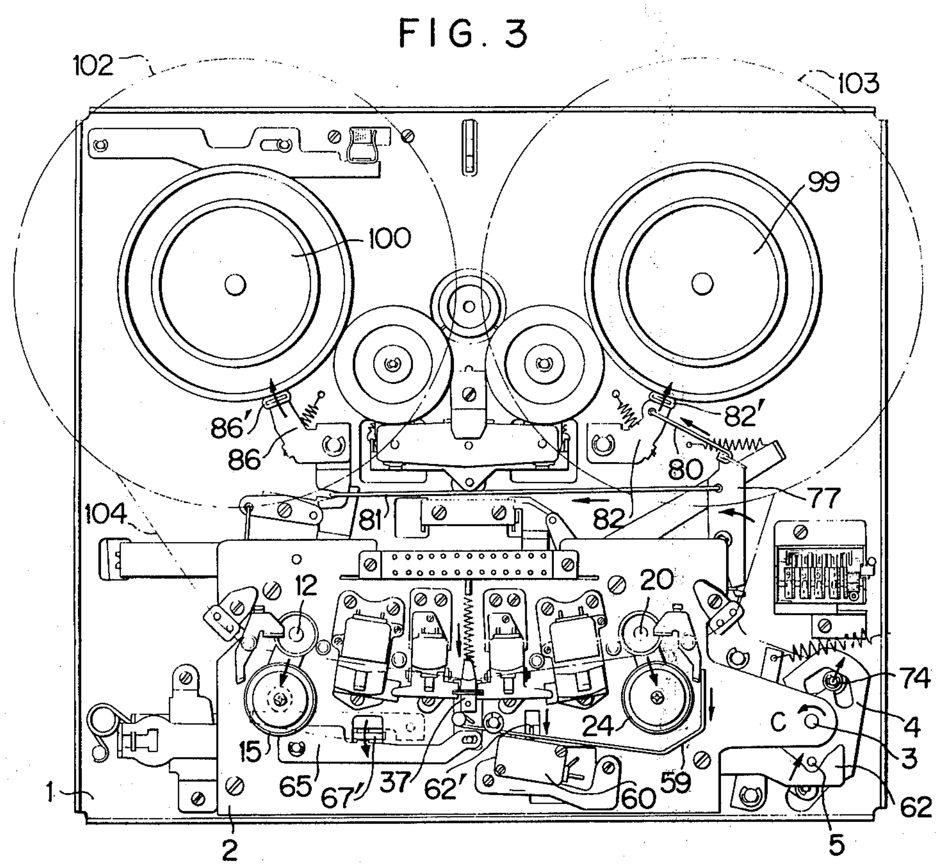
FIG. 3 is a top plan view showing the stop state.
Figure 4:
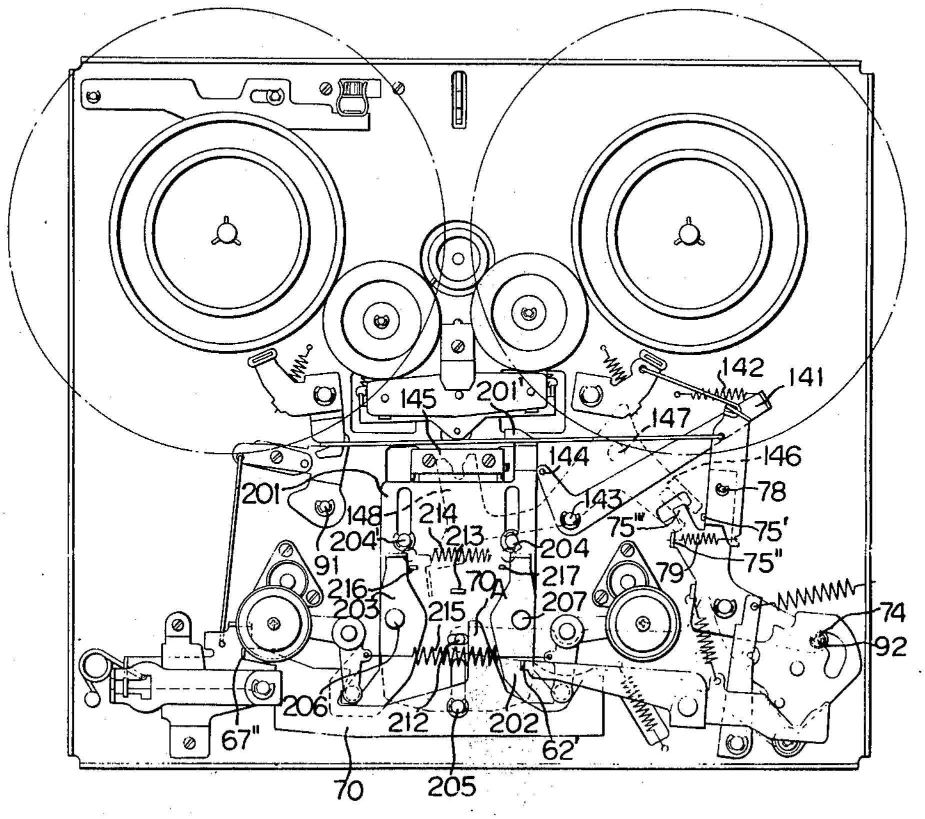
FIG. 4 is a top plan view of the main portion of the apparatus, showing the forward recording or playback state.

Next, description will be made of the operation of the respective portions when the recording-playback state shown in FIGS. 1 and 4 is switched to the stop state shown in FIGS. 3 and 5. First of all, the operation change-over means 3 is turned counter-clockwise (in the direction shown by an arrow C) so that the cam plate 4 coaxial with respect to the means 3 is also rotated to cause the levers and other parts associated therewith to be rotated. Thus, the brake lever 75 is rotated counter-clockwise as indicated by an arrow to move the brake rods 80 and 81 to the left. Consequently, the brake levers 82 and 86 are pressed against the reel stands 99 and 100 to brake (or stop) the latter.

The shut-off lever 62 is also rotated counter-clockwise (in the direction indicated by an arrow), so that the shut-off pin 59 is rotated clockwise by the nail portion 62' provided on the other end of the shut-off lever 62 so as to be separated from the tape 104. Also, the playback lever 210 is rotated counter-clockwise to move the control plate 201 downwardly (in the direction indicated by an arrow). Thus, the levers 202 and 203 on the control plate 201 are also moved so that the nail portions 202' and 203' of the levers 202 and 203 are disposed out of engagement with the rollers 218 and 219 of the pinch roller arms 16 and 25. As a result, the pinch rollers 15 and 24 are separated from the capstans 12 and 20 by the force of the spring 215, respectively. At this time, the shaft 18 of the left pinch roller 15 is brought into contact with the lever 67 to rotate the latter toward this side (in the direction indicated by an arrow). Thus, the pad shifter 37 is pulled toward this side against the spring 38, thereby separating the respective pads from the respective heads.

The idler-off lever 141 is rotated clockwise by the nail portion 75''' of the brake lever 75 so that the pin 111 of the idler driving lever 110 is retained in the fork-end portion 148 of the idler-off lever 146 to separate the idlers 95 and 97 from the motor pulley 93.

Figure 5:
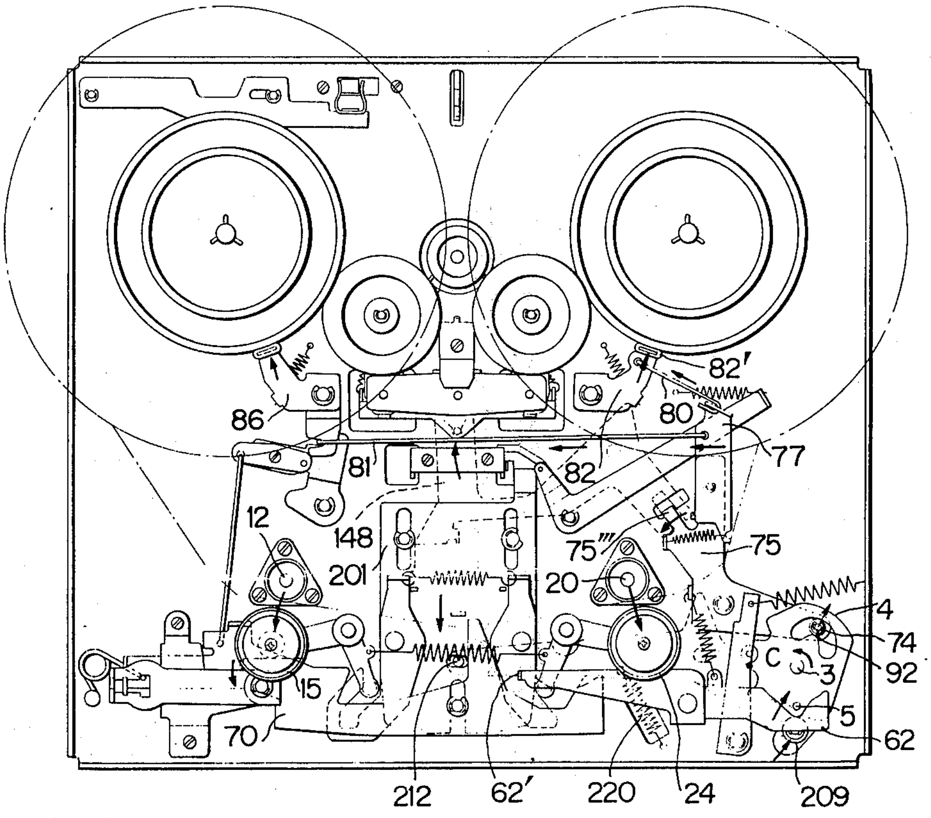
FIG. 5 is a top plan view of said main portion, showing the stop state.
Figure 6:
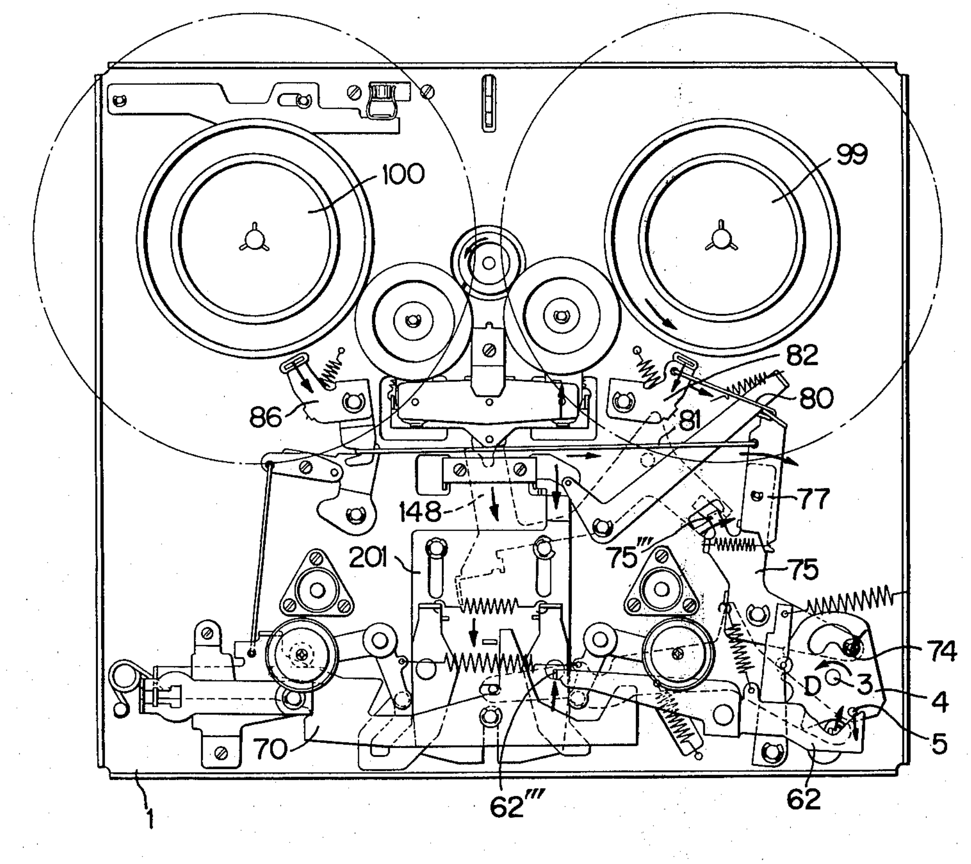
FIG. 6 is a top plan view of the main portion, 25 showing the fast-winding state.
Figure 7:
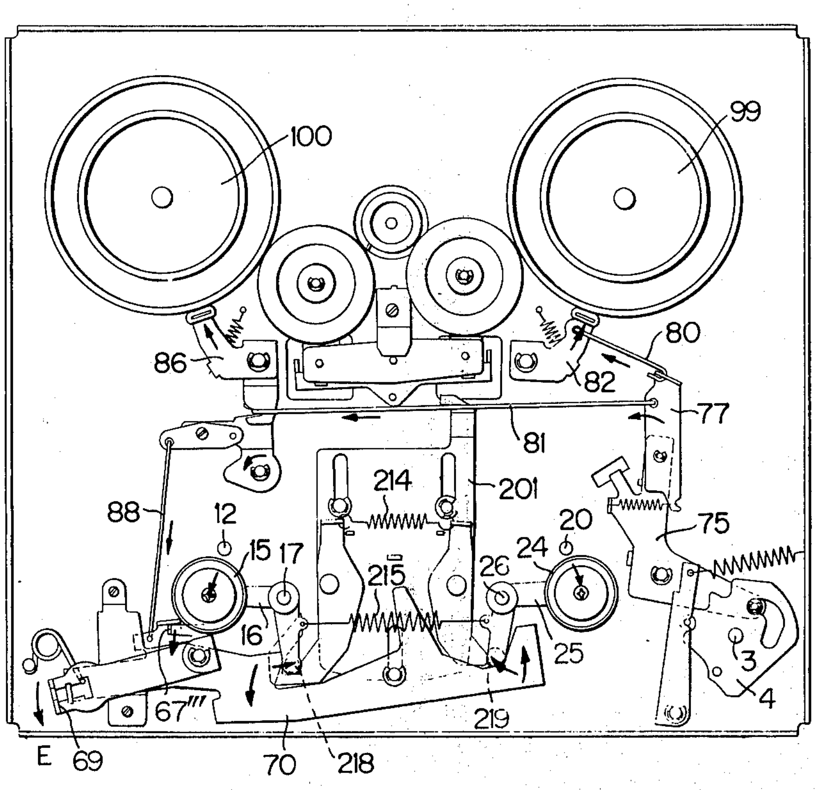
FIG. 7 is a top plan view of the main portion, showing the temporary stop state.

Description will next be made of the operation of the respective portions when the stop state shown in FIGS. 3 and 5 is switched to the fast-winding state shown in FIG. 6. Turning the operation change-over means 3 counter-clockwise (in the direction indicated by an arrow) causes the cam plate coaxial therewith to be rotated, so that the respective levers are rotated in the directions indicated by arrows. First of all, the brake lever 75 is rotated clockwise to pull the brake rods 80 and 81 to the right so that the brake levers 82 and 86 are separated from the reel stands 99 and 100 against the springs 83 and 87 so as to be rotatable. The idler-off lever 146 is rotated counter-clockwise so that the pin 111 of the idler driving lever 110 is removed from the fork-end portion 148 of the idler-off lever 146. Thus, one of the idlers 95 and 97 is pressed against the motor pulley 93 and one of the reel stands 99 and 100 so that the reel stand is rotated. The playback lever 210 is rotated counter-clockwise to further move the control plate 201 downwardly, while the pinch roller arms 16 and 25 are not rotated. At this time, the force end 201' of the control plate 201 is brought into engagement with one end of the fast-forward lever 159 adapted for rotation about a shaft 160 to push it downwardly as indicated by an arrow, so that the lower end of the shaft 105 of the idler lever 109 is moved upwardly against a spring 161 by a liplike spring plate 158 fixed to the fast-forward lever 159. Consequently, the idlers 95 and 97 are moved from the positions relates to the reel stand pulley 171 to those related to the reel stand pulley 170. In this way, the rotation of the motor is transmitted directly to the reel stand so that the latter is rotated at a high speed corresponding to the fast-forward. FIG. 12 shows the stop state.

Mention will now be made of the operation as the control plate 201 and pinch rollers 15 and 24 are moved from the stop position to the record-playback position. By rotating the operational lever shaft clockwise (in the opposite direction to that indicated by the arrow) in FIG. 3, the control plate 201 and levers 202 and 203 mounted thereon are moved upwardly. With the movement of the control plate 201, the rollers 218 and 219 of the pinch roller arms 16 and 25 are brought into nail portions 202' and 203' of the levers 202 and 203 by way of oblique surface portions, respectively. As the rollers 218 and 219 move on the oblique surface portions, the pinch rollers 15 and 24 are caused to come closer to the capstans 12 and 20, respectively. In this case, the design is such that the rollers 218 and 219 are caused to ride on the nail portions 202' and 203' of the levers after the pinch rollers 15 and 24 have been placed in engagement with the capstans 12 and 20. Therefore, the control plate 201 is further moved even after the pinch rollers 15 and 24 have been disposed in engagement with the capstans 12 and 20. When the rollers 218 and 219 ride on the nail portions 202' and 203' respectively, the levers 202 and 203 are separated from the stoppers 216 and 217 respectively, so that the force of the spring 214 is transmitted to the pinch rollers 15 and 24 through the nail portions 202' and 203'. The two pinch rollers are uniformly pressed against the capstans since they are associated with the single common spring. Also, a pressing force is imparted to the pinch rollers even by the fact that the levers 202 and 203 are slightly removed from the stoppers 216 and 217 at the end of the stroke of the control plate. Hence, the force needed for operation can be minimized. Substantially no pressing force is applied to the pinch rollers when the latter contact the capstans, so that a shock imparted to the capstans and pinch rollers can be decreased, thus preventing the bearings from being damaged.

Description will now be made of the operation of the pinch rollers when the apparatus is temporarily stopped in the recording or playback state. By driving the temporary stop operating lever 69 in the direction indicated by an arrow E, the temporary stop lever 70 is rotated in the same direction (counter-clockwise), so that the rollers 218 and 219 of the pinch roller arms 16 and 25 are pushed by the operating portion of the temporary stop lever 70 in such a direction that the pinch rollers 15 and 24 are separated from the capstans 12 and 20. Thus, a part 70B of the temporary stop lever 70 is brought into contact with the fore end 67'' of the lever 67 to rotate the latter counter-clockwise, with a result that the pad shifter 37 interlocking with said fore end is moved to separate the pads from the heads. At the same time, the temporary stop rod 88 connected with the temporary stop lever 70 is drawn in the direction indicated by an arrow to draw the brake rod 81 through the temporary stop brake lever 90, so that the brake lever 77 is rotated about shaft 78 counter-clockwise against the spring 79. As a result, the left brake lever 86 and right brake lever 82 are pressed against the reel stands 99 and 100 to brake (or stop) the latter. Thus, the main brake can be used in common with the temporary stopping operation, and the brake lever is not moved. Therefore, the damping operation described above has no effect on other operations than damping. In this way, the apparatus can be instantly switched from the temporary stop state to the recording or playback state, and thus the force required for the manipulation can be correspondingly reduced to advantage.

In this case, the movement of the temporary stop lever 90 and related portions is effected in a predetermined order. That is, the pads are first separated from the heads, and then the pinch rollers are separated from the capstans to press the brakes against the reel stands. Thus, the tape is completely prevented from being loosened. Practically, it is almost impossible to simultaneously separate the pinch rollers from the capstans. By initially separating the pads from the heads, therefore, even if either one of the pinch rollers is separated from the related capstan in advance, no braking force is imparted to the reel stand so that the unwound tape is taken up. However, if the pads were pressed against the heads at this time, the tape would be loosened at the pads due to friction. In accordance with this invention, the reel stands are braked so that the reels are completely stopped after the two pinch rollers have been completely separated from the capstans. Thus, the tape is stopped without being loosened. The adjusting piece 89 of the temporary stop brake lever 90 is provided for the purpose of adjusting the timing of the braking operation described above. In an attempt to release the temporary stop, the operation is effected in the reverse order. That is, the brakes are first separated from the reel stands, then the pinch rollers are pressed against the capstans, and thereafter the pads are pressed against the heads. In the conventional system wherein the tape is transported with the two pinch rollers always pressed against the capstans, a temporary stop could not be effected since it is practically impossible to simultaneously separate the two pinch rollers from or press them against the capstans, while in accordance with this invention, such temporary stop can be achieved in the system of the aforementioned type, which constitutes a great advantage. (In the conventional apparatus including a single tape driving mechanism, it is almost unnecessary to pay attention to the timing described above. It will be seen, therefore, that the present invention can be effectively applied to the case where there are two tape driving mechanisms.)

An engaging portion 70A is provided on the temporary stop lever 70 at a position corresponding to the projection 213 provided on the control plate 201. In the stop and recording or playback states, the engaging portion 70A does not contact the projection 213 of the slide plate irrespective of the rotation of the temporary stop lever 70, while in the fast-forward state, the engaging portion 70A is brought into contact with the projection 213 by the rotation of the temporary stop lever 70 so as to be prevented from being completely rotated. Therefore, it is impossible to manipulate the temporary stop operational lever 69. In case the apparatus is switched from the temporary stop state to the fast-forward state, too, the projection 213 is caused to contact the engaging portion 70A as a result of the movement of the control plate 201. Thus, the control plate is prevented from being moved further. This means that the operational lever shaft 3 cannot be moved to the fast-forward position.

If the temporary stop is effected during the fast-winding operation, a braking force is imparted to the reel stands irrespective of the fact that a power is being transmitted to the reel stands, and the braking force is determined so that it is strongly applied to the reel stand on the tape supplying side and weakly to that on the tape take-up side (as to the method of achieving this, refer to Japanese Pat. publication No. 1028/1950), thereby preventing the tape from being loosened when its transportation is stopped. Thus the braking force is imparted the reel stands while the tape is being taken up, so that the tape tends to be expanded or cut off. The tape also tends to be expanded or cut off when the apparatus is switched from the temporary stop state to the fast-winding state. If no such extreme case occurs, it is possible to effectively eliminate misjudgment about whether there is trouble because the fast-winding operation is not performed. Thus, a safety means therefore can be provided.

Figure 15:
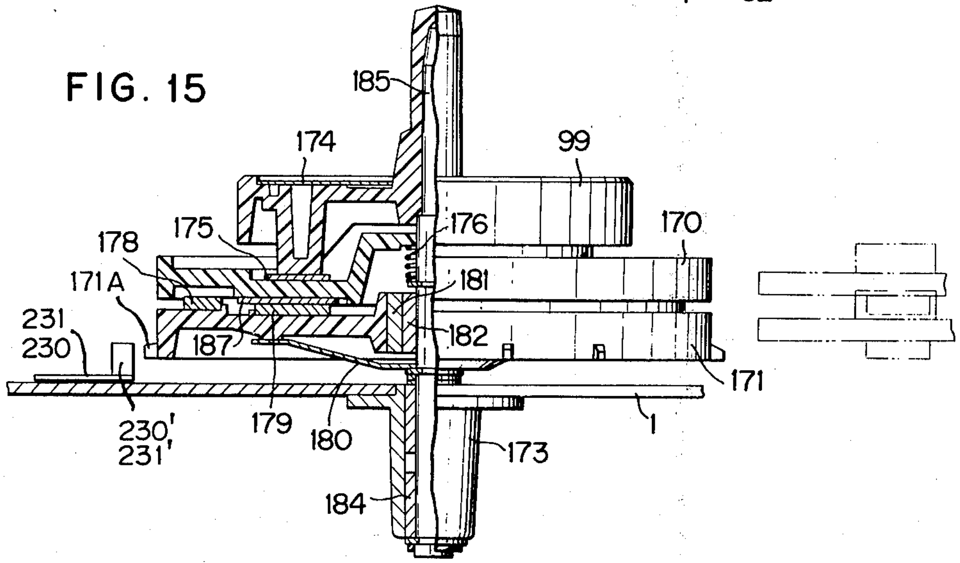
FIG. 15 shows the construction of the reel stand for use with the apparatus as shown in FIG. 14.

A still further embodiment of this invention will be described with reference to FIGS. 14 and 15. A certain back tension is required for the purpose of stably transporting the tape. FIGS. 14 and 15 show a reciprocating recording-reproducing apparatus wherein such back tension can be changed over without delay when the running direction of the tape is changed so that the back tension is applied only to the tape supplying side. A plurality of projections 171A are provided on the reel stands. Levers 230 and 231 to be disposed in engagement with the projections 171A are pivotally attached to shafts 84 and 85, respectively, and weak springs 232 and 233 are secured to the levers 230 and 231 thereby pressing the latter against the reel stands. If the apparatus is set to the recording or reproducing state by rotating the operational lever shaft 3 clockwise, the playback lever 210 and brake lever 75 are rotated by the cam plate 4 so that the control plate 201, brake levers 84 and 85 and idler-off lever 146 are rotated. Thus, the pinch rollers 15 and 24 are pressed against the capstans 12 and 20, the brake shoes 82' and 86' are separated from the reel stands, the pin 111 of the idler driving lever 110 is released from the fork-end portion of the idler-off lever 146, and the idler 95 is pressed against the motor pulley 93 and reel stand 99 by the belt 114 so that the rotation is transmitted to the reel stand. At this time, one end of the lever 231 is brought into contact with the shaft 107 of the idler arm 112, and the nail portion 231' provided on the other end of the lever is separated from the projection 171A of the reel stand pulley. One end of the other lever 230 is separated from the shaft 108 of the idler arm 113 as the shaft 108 is rotated counter-clockwise, and the nail portion 230' provided on the other end is brought into engagement with one of the projections 171A of the left reel stand pulley to stop the latter from rotation. The spools are rotated as the tape is transported. Since the reel stand 100 carrying a spool thereon and reel stand pulley 170 are rotated but the reel stand pulleys 170 and 171 are caused to frictionally slip by means of the spring 180, a back tension resulting from the frictional force between the reel stand pulleys is applied to the tape if the reel stand pulley 171 is engaged by the nail portion 230' of the lever. In this way, the levers 230 and 231 which are moved by the belt 114 driven in the direction of the rotation of the motor and idlers 95 and 97 connected with the belt are disposed into or out of engagement with the projections provided on the reel stand pulley 171. Thus, proper back tension is applied to the tape only in the direction of rotation of the motor the moment the direction of rotation is changed, thereby preventing the tape from being loosened.

Figure 8:
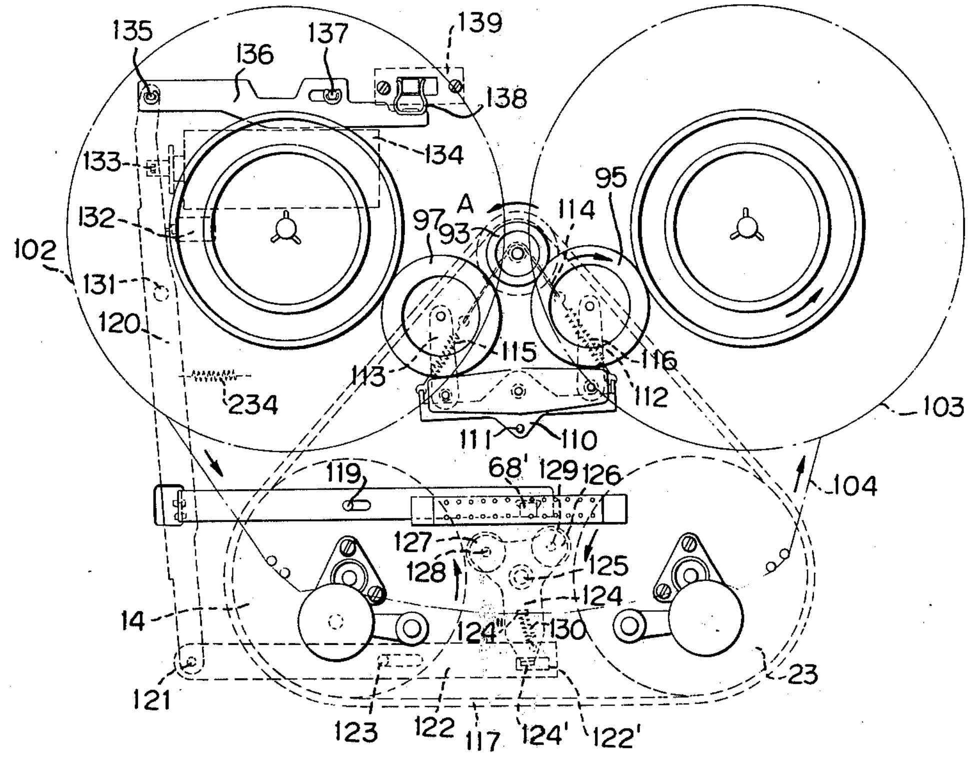
FIG. 8 is a view showing the state of the driving system when the apparatus is driven in the forward direction.
Figure 9:
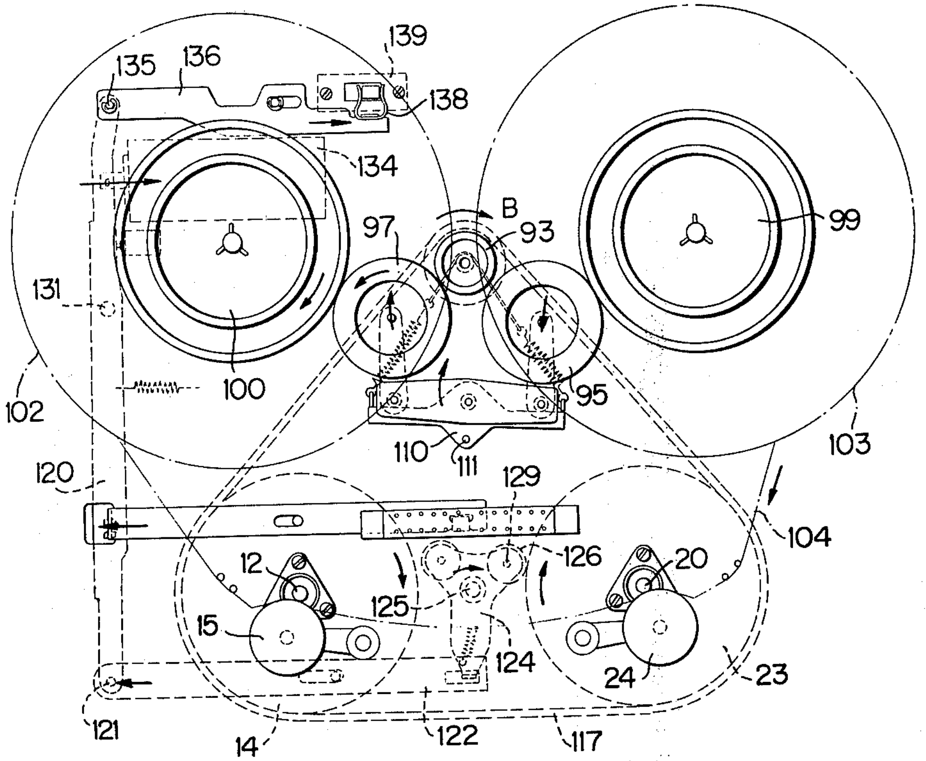
FIG. 9 is a view, showing the state of the driving system when the apparatus is driven in the reverse direction.
Figure 10:
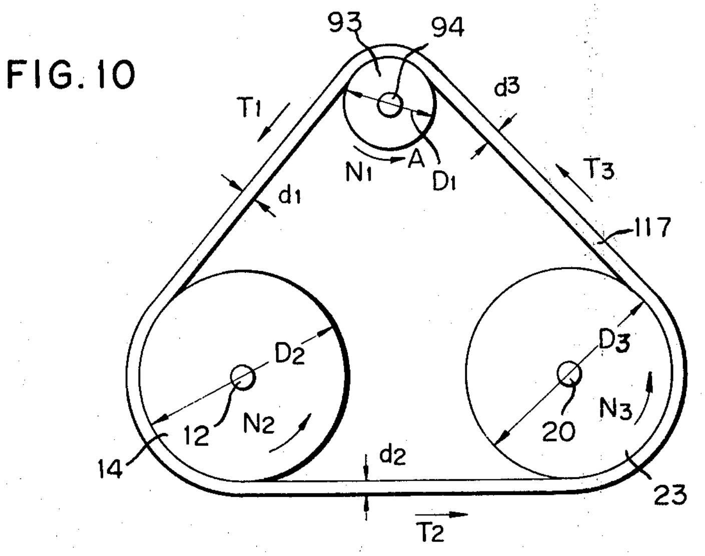
FIG. 10 is a view illustrating the relationship between motor pulley, fly-wheels and belt.

The drive mechanism will be described below with reference to FIGS. 8 and 9. FIG. 3 shows the forward state, and FIG. 9 shows the reverse state. With the solenoid lever 120 connected with the solenoid 134 are associated motor reversing change-over switch 139, head connection changeover switch 68, solenoid holding switch 132, returning spring 234 and flywheel brake lever 122. The flywheel brake lever 122 is engaged with the solenoid lever 120 through a pin 121, and it is moved while being guided by the pin. A very weak spring 130 is interposed between the flywheel brake lever 122 and a lever 124 which is rotatably mounted on a shaft 125 and has brake rollers 126 and 127 mounted thereon by pins 128 and 129 respectively. The spring 130 serves to rotate the lever 124 through a clock action. During the forward operation the solenoid 134 is not energized so that the brake roller 127 lightly contacts the left flywheel 14 and it is out of contact with the right flywheel 23. During the forward operation, the braking force provided by the brake roller 127 is so low that it constitutes little or no load. If the left contact poles 30 and 30' are shorted with the metal foil provided on the tape, a current is caused to flow through the solenoid 134 to change over the respective switches 139, 132 and 68. If the connection for the motor is changed, the rotation of the motor is not instantly reversed due to the inertia of the motor and that of the flywheels. However, since the brake roller 126 is brought into contact with the right flywheel 23 so that it is self-intruded to forcibly stop the right flywheel 23, thereby expediting the reversal in rotation of the motor. When the direction of rotation is changed as shown by the arrow B, the self-intrusion of the brake roller 126 is released so that the roller is disposed only in light contact with the flywheel (this is the same principle as that disclosed in Japanese Pat. publication No. 1028/1950), thus producing little or no braking force. In case the apparatus is switched from the reverse operation to the forward operation, too, similar action is effected with respect to the right flywheel, thus forcibly reversing the motor quickly. Such braking force imparted to the flywheel constitutes little or no load during the rotation, and only at the moment of reversal, a great braking force is applied to the flywheel, thereby forcibly changing the direction of rotation quickly. In this way, the period of time for which the tape speed is non-uniform can be shortened, thus minimizing the period of time for which unnatural recording or playback is effected. At this time, the idler is rotated in the direction of rotation of the motor through the frictional movement of the belt 114 wound on the motor pulley 93. Upon reversal in rotation of the motor, the idler can be pressed against one of the right and left reel stands, thereby preventing the tape from being damaged due to its slack.

As described above, in accordance with the present invention, there is provided an automatic reversing type tape recorder including two sets of tape drive mechanism wherein the tape transportation can be reversed merely by reversing the rotation of the motor without mechanically switching the drive system, and various switches are changed over by the use of an electromagnetic plunger. Especially, in accordance with the present invention, the tape winding force imparted to the reel stands can be changed merely by the reversal of the motor and simultaneously therewith. Thus, it is possible to prevent the tape from being loosened and achieve smooth reversal. The back tension applied to the tape can also be changed simultaneously with the changing of the tape winding force. The combination of these two features makes it possible to effectively prevent the tape from being loosened, and in addition the power produced by the motor can be economically utilized because the change-over of the tape winding force and back tension can be achieved by use of the same structure for each reel stand.

We claim:

1. In a magnetic tape recording and reproducing apparatus, comprising first and second reel stands for mounting tape supply and take-up reels, drive means for selectively driving said reel stands in opposite directions of rotation, first and second flywheels, having tape drive capstans mounted thereon, coupled to and rotatably driven by said drive means, control means coupled to said drive means for controlling the direction of rotation of said reel stands and said flywheels, and braking means mounted for engagement with said flywheels to exert a braking force on at least one of said flywheels when the direction of rotation of said flywheels is changed by said control means, said braking means comprising:

a rocker member movably mounted on a base plate of said apparatus;

first and second brake rollers mounted on said rocker member for engagement with said first and second flywheels, respectively;

a brake lever coupled to said control means for movable between first and second positions depending on the direction of rotation of said reel stands and flywheels; and means coupling said brake lever to said rocker member for moving said rocker member between first and second positions in correspondence with said first and second brake lever positions, wherein in said first position of said rocker member, said first brake roller engages said first flywheel to apply at least a momentary braking force thereto and said second brake roller is disengaged from said second flywheel, and in said second position of said rocker member, said second brake roller engages said second flywheel to apply at least a momentary braking force thereto and said first brake roller is disengaged from said first flywheel.

2. The apparatus according to claim 1, wherein said rocker member is mounted on said base plate for pivotal movement between its first and second positions and said brake rollers are mounted on axially opposite arm portions of said rocker member.

3. Apparatus according to claim 1, wherein said means coupling said brake lever to said rocker member comprises spring means having one end portion fixed to said brake lever and an opposite end portion fixed to said rocker member such that in said first position of said brake lever said spring means urges said rocker member into movement toward its first position to engage said first brake roller with said first flywheel, and in said second position of said brake lever said spring means urges said rocker member into movement toward its second position to engage said second brake roller with said second flywheel.

4. The apparatus according to claim 3, wherein said control means comprises a solenoid which is deenergized during rotation of said reel stands and said flywheels in their first direction, means for energizing said solenoid coincident with a reversal of the direction of rotation of said reel stands and flywheels, means coupling said brake lever to said solenoid for moving said brake lever toward its second position when said solenoid is energized, and means urging said brake lever towards its first position when said solenoid is deenergized.

* * * * *